Sept. 29, 1936.  R. K. HOPKINS  2,055,533
ARC WELDING MACHINE
Filed May 11, 1932
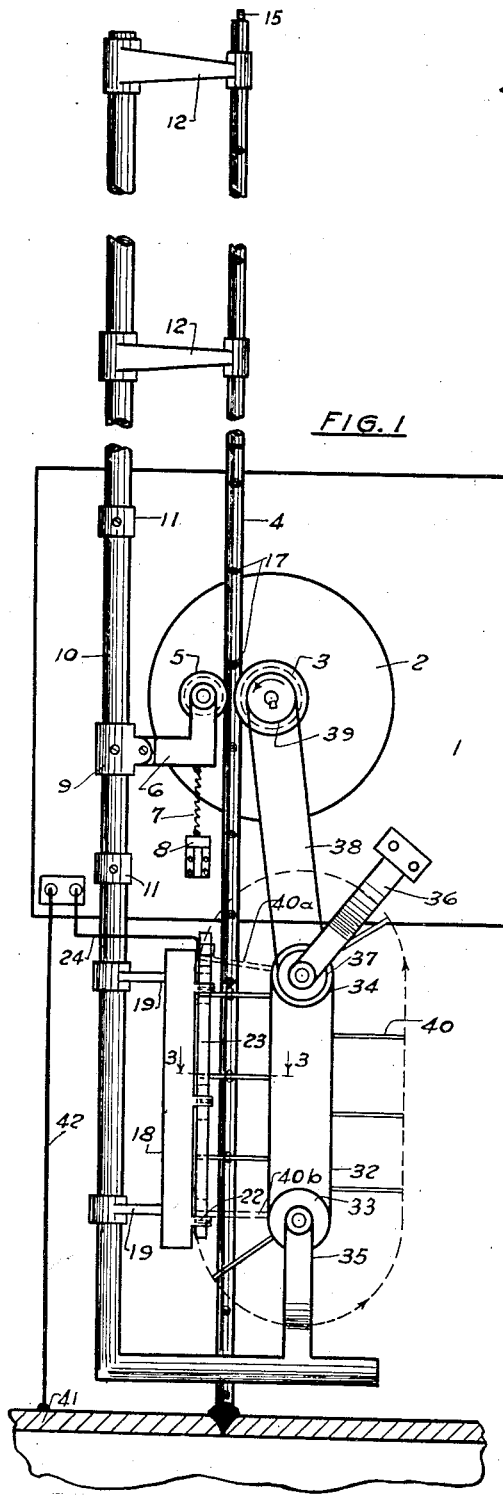
FIG. 1
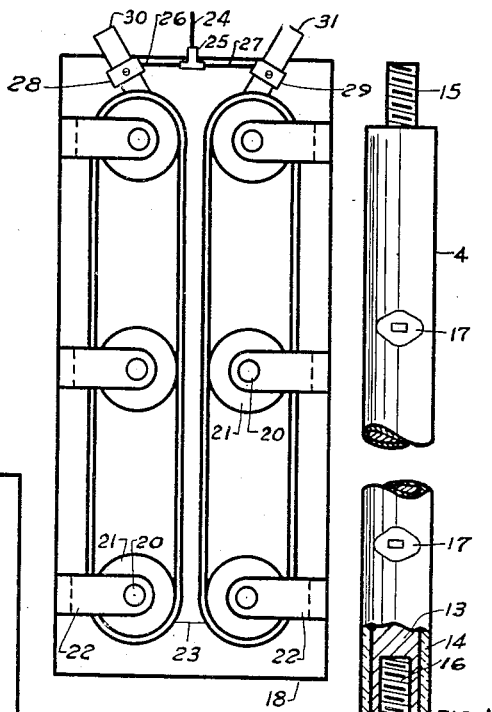
FIG. 2
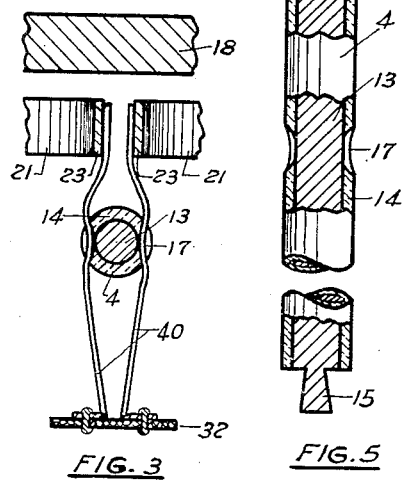
FIG. 3
FIG. 4
FIG. 5
INVENTOR
Robert K. Hopkins
BY
Virgil F. Davis
ATTORNEY Patented Sept. 29, 1936

2,055,533

UNITED STATES PATENT OFFICE 2,055,533

ARC-WELDING MACHINE

Robert K. Hopkins, New York, N. Y., assignor to The M. W. Kellogg Co., New York, N. Y., a corporation of Delaware Application May 11, 1932, Serial No. 610,553

6 Claims. (Cl. 219—8)

This invention relates in general to arc-welding and in particular to a method and apparatus for carrying on as a continuous operation arc-welding in which welding rods, or electrodes covered with ceramic or other non-conducting material, are used.

Machines capable of carrying on arc-welding as a continuous operation while using bare welding electrodes, either in the rod or coil form, are known to the art. The successful operation of these machines depends on the fact that every portion of the surface of the electrode is capable of acting as the point of application of the current. Since the covering material of the covered welding electrodes is a non-conductor of electric current, the machines mentioned would be rendered inoperative if it were attempted to use covered welding electrodes.

At present covered welding electrodes are used in arc-welding machines which are provided with an electrode feeding element to which a bare end of the electrode is clamped or otherwise fixed. The machines include actuating mechanisms and control means therefor for moving as a unit the electrode feeding element and the electrode fixed thereto, toward the crater of the weld at the proper rate to maintain a constant length arc, and for oscillating the electrode feeding element and the electrode across the crater of the weld. The current is passed to the electrode through the bare end thereof. When an electrode is consumed, it is necessary to break the arc and to return the electrode feeding element to a position sufficiently removed from the crater of the weld to allow the fixing of a new electrode thereto. Since the electrode feeding element moves at substantially the same maximum rate in both directions, about one-half of the operating time of the machine is taken up in returning the electrode feeding element. The interval between the breaking of the arc and the starting of a new electrode is sufficiently long to cause a substantial cooling of the weld. This, added to the fact that the metal deposited when a new arc is started is generally porous, necessarily causes inherently weak spots along the weld.

The length into which the electrodes are cut is, in the main, determined by their diameter and by the current to be passed through them. Since the point of application of the current to the electrode is fixed, these electrodes heat excessively and only a comparatively short length can be used before the temperature rises to a point where severe disintegration of the covering material takes place. Due to the construction of the machines at present known, the electrodes must be made of a length somewhat longer than the length which can actually be used with a consequent substantial wastage of valuable electrode material.

This invention has for an object a method and apparatus by which it is possible to carry on arc-welding with covered welding electrodes as a continuous welding operation.

The invention has for a further object the provision of apparatus for automatically leading the welding current to a plurality of consecutive exposed areas or pairs of areas of the metallic core of a covered electrode.

The invention has for a further object apparatus which is adapted to feed to the arc a covered electrode of indefinite length having spaced contact areas, and which includes means movable with the electrode adapted to automatically connect consecutive contact areas of the electrode to a welding current supply as each of said areas enters a predetermined portion of their path to the arc and adapted to automatically disconnect each of said areas from the welding current supply as said areas leave the predetermined portion of their path to the arc.

The particular nature of the invention, as well as other objects and advantages thereof, will appear most clearly by reference to the accompanying drawing, wherein Figure 1 is a front elevation of an arc-welding machine embodying a preferred form of the invention, Figure 2 is a front elevation of a guide member, Figure 3 is a sectional plan view taken on line 3—3 of Figure 1, Figure 4 is a part sectional front view of a section of the welding electrode, and Figure 5 is a view similar to Figure 4, but with the welding electrode rotated through 90 degrees and showing a different form of connecting means.

Referring to the drawing:

The welding current generator, the control means therefor as well as the welding electrode oscillating motor, etc., which per se form no part of this invention, will for the purpose of this description be considered as located in rear of the panel 1, with the welding electrode oscillating motor mounted to oscillate panel 1. A welding electrode feeding motor 2, the control means of which (not shown) is located at the rear of panel 1, is mounted on panel 1 to oscillate therewith. A grooved wheel 3 is keyed to the shaft of motor 2 and engages a portion of the bottom section of the welding electrode 4. The diametrically opposite portion of welding electrode 4 is engaged by a grooved wheel 5 which is mounted in a pivoted bracket 6. A spring 7 has one end anchored in a loop at the bottom of bracket 6, its other end being anchored in a loop on a bracket 8, which is bolted or otherwise fastened to panel 1. Spring 7 constantly urges wheel 5 into contact with welding electrode 4 and causes it to bear against wheel 3 with sufficient pressure to prevent slippage. The contact portions of wheels 3 and 5 are made of fibre or some other material to prevent damage to the coating as the welding electrode 4 passes between them.

The member 9 supports the pivot of bracket 6 and is fastened to an L-shaped guide member 10 which is in turn fastened by means of brackets 11 to panel 1 to oscillate therewith. The upper portion of guide member 10 has fastened thereto spaced guide brackets 12 through which pass the sections of the welding electrodes 4 on their way to wheels 3 and 5. The lower portion of guide member 10 is provided with a guide hole through which passes the welding electrode as it approaches the arc.

The welding electrode 4 is made up of an indefinite number of sections, that is to say, as one section is consumed, another is added to the remaining section, or sections, and this procedure continued indefinitely. Each section, as shown in Figures 3–5, comprises a metallic core 13 about which is formed a covering 14 of ceramic or other non-conducting material. One end of each section is provided with the male member 15 and the other end with the female member 16 of a joint forming means. The specific form of joint forming means is not very important. It must, however, be such that the sections may be easily and quickly joined and the joint must be sufficiently strong to support the weight of the welding electrode 4 below the wheels 3 and 5, also it must give a sufficiently intimate metal to metal contact to allow the passage of the necessary welding current. In addition, the joint must be such that there is not a substantial gap between the end of one section and the beginning of the next. Figure 4 shows a section provided with the members of a threaded joint and Figure 5, a section provided with the members of a dove-tail joint.

To provide for the passage of the welding current from the current supply to the metallic core 13 of the welding electrode 4, portions of the covering 14, equally spaced apart along the length of the electrode 4, are ground out or otherwise removed to expose or substantially expose small areas of the metallic core 13. The voids 17 in the electrode covering 14, thus produced, approximate a frustum of a cone in shape and as shown in Figures 3–5, expose but a small portion of the electrode core 13 while they allow ready access for contact therewith. The shape of voids 17 may be varied but to produce the result intended it is essential that but a small area of the surface of metallic core 13 be exposed and a minimum amount of the circumference of the covering 14 adjacent the core be broken. If too much of the circumference of core 13 is exposed a part of covering 14 immediately below the exposed portion will fall into the crater of the weld as the exposed portion comes into the arc. This covering material might later be covered with metal and thus seriously weaken the weld.

In the preferred form of welding electrode 4, voids 17 are provided at diametrically opposite portions thereof, at points equally spaced apart along the length thereof. This construction is very satisfactory but it is not necessary that voids 17 be so arranged as they might be made on one side only, or staggered.

The welding electrode 4, after leaving feed wheel 3, approaches a guide member 18 which is suitably supported from guide member 10 by brackets 19. The face of member 18 adjacent electrode 4 is bored to provide bearings for one end of each of short shafts 20 which carry wheels 21. The other end of each of short shafts 20 is supported in members 22 which extend from member 18. Wheels 20 support endless metal belts 23. The middle wheel 21 is used to prevent substantial sag in belts 23. One side of the welding current is conducted from the generator, not shown, through cable 24 to a connector 25 through cables 26 and 27 to brush supports 28 and 29 which are supported from member 18. Brush supports 28 and 29 carry brushes 30 and 31 which are adapted to bear on belts 23. Brush supports 28 and 29 are of the usual construction and may include spring means for constantly urging brushes 30 and 31 into contact with belts 23. The other side of the welding current is conducted from the generator, not shown, to the work 41 by cable 42.

Opposite guide member 18 is an endless belt 32 supported on pulleys 33 and 34. Pulley 33 is mounted on a shaft which is journalled in bearings on bracket 35 formed integral with the bottom of guide member 10. Pulley 34 is keyed to a shaft which is journalled in bearing in bracket 36 fastened to panel 1. A sprocket wheel 37 is also keyed to the shaft supported in bracket 36 and is driven by an endless chain 38 which passes over a sprocket wheel 39 keyed to the shaft of motor 2. Sprockets 37 and 39 are of the same diameter. Pulleys 33 and 34 have as their diameter the effective diameter of wheel 3; i. e., the diameter of wheel 3 which is in contact with the welding electrode 4. By this arrangement belt 32 moves at the identical speed as welding electrode 4 and is subject to the identical control.

Equally spaced apart along the length of belt 32 are fastened, by rivets or other similar means, pairs of spring contact members 40, which are adapted, as shown in Figure 3, to lead the welding current from belts 23 to the metallic core 13 of welding electrode 4. The shape of the individual members of each pair of contact members 40 is such that in their open position they freely pass electrode 4 between them and when in the closed position firmly contact with the exposed portions of metallic core 13.

Guide member 18 is positioned relative to pulleys 33 and 34 so that the centers of top wheels 21 are below the center of pulley 33 and the centers of bottom wheels 21 are above the center of pulley 33.

When the arc-welding machine is initially adjusted, the voids 17 of electrode 4 are brought to register, by manual movement, with the spring contact members 40 as shown in Figure 1, after the machine is set in operation, since the electrode 4 and the belts 32 move at the identical speed and are subject to the identical control the relation between the voids 17 and the contact members 40 is maintained.

In the operation of the machine as electrode 4 moves toward the arc from the position shown in Figure 1, the top one of the pairs of contact members 40 in contact with belts 23 will move toward the position of the second one of the pairs of contact members 40. At the same time the top one of the pairs of members 40, on the side of belt 32 removed from electrode 4, will move toward the position of the top one of the pairs of contact members 40 in contact with belts 23. In going to the latter position, the members 40 of the pairs, being distended, will pass over electrode 4 and move toward the next one of voids 17. When this pair of contact members 40 reaches the dotted position 40—a members 40 will begin to contact with belts 23 and be brought towards each other until at the full line position, immediately below 40—a, they will contact with the exposed areas of core 13 at void 17 and lead the welding current thereto. The parts are so proportioned and arranged that contact members 40 do not contact with electrode 4 until they reach a position at or below the centers of the top pair of wheels 21 so that there is substantially no relative movement between members 40 and electrode 4 after they are in contact with each other and wear of members 40 is avoided.

Contact members 40 in leaving electrode 4 at the bottom of guide member 18 pass from a dotted position 40—b at which they are just above the centers of the bottom pair of wheels 21 to the solid line position immediately below. In going to the latter position, the members 40 separate by reason of the increasing space between belts 23 and when they reach the latter position are spaced apart sufficiently to be out of contact with electrode 4. Because of this arrangement, there is no relative movement between members 40 and electrode 4 when they are in contact with each other.

The members 40 in going from the top to the bottom position carry belts 23 along with them. This eliminates wear on members 40 and prevents sparking. It is to be noted that a plurality of members 40 are in contact at all times with the exposed portions of core 13 and that the welding current passes to the core 13 through a plurality of points. Because of this, there is no sparking, or at worst, only a negligible amount of sparking, when members 40 make or break contact with the exposed portions of core 13.

While preferred forms of the apparatus have been shown and described and a preferred method has been disclosed, it will be understood that the invention may be embodied in other forms, that various changes may be made in the structural details of the apparatus, and that the method may be modified without departing from the principle of the invention as defined in the appended claims.

I claim:

1. In an arc-welding machine adapted to use a welding electrode having a conducting core and a non-conducting covering broken at spaced intervals to expose small areas of the core, means for feeding the electrode to the arc, welding current supply means, movable endless means extending between predetermined points in the electrode path connected to said welding current supply means and means movable in an endless path a portion of which includes the portion of said electrode path between said predetermined points for connecting said areas to said endless means as said areas pass through the portion of said electrode path between said predetermined points.

2. In an arc-welding machine adapted to use a welding electrode having a conducting core and a non-conducting covering broken at spaced intervals to expose small areas of the core, means for feeding the electrode to the arc, welding current supply means, endless means positioned adjacent the electrode path and connected to said welding current supply means, said endless means being movable in a path a portion of which is parallel to the path of the electrode and extends between predetermined points in the path of the electrodes and means movable in an endless path which includes the portion of said electrode path between said predetermined points for connecting said areas to said endless means as said areas pass through the portion of said electrode path between said predetermined points.

3. In an arc-welding machine of the character described in which a welding electrode is fed to an arc struck between said electrode and the work, the combination of means for feeding the electrode to the arc, welding current supply means, a support positioned adjacent the path of said electrode, a pair of spaced endless members mounted for movement on said support, means for conducting welding current from said supply means to said endless members and contact members movable with said electrode between two predetermined points in the path of the electrode adapted to contact with said endless members and the electrode while moving with the electrode between said predetermined points in said path.

4. In an arc-welding machine of the character described in which a welding electrode is fed to an arc struck between said electrode and the work, the combination of means for feeding the electrode to the arc, welding current supply means, a support positioned adjacent the path of said electrode, a pair of parallel spaced endless members supported on said support, each of said endless members being movable in a path having curved end portions and a straight middle portion, means connecting said endless members to said current supply means, and contact means movable between said endless members, said contact means being adapted to contact with the electrode and said endless members as said contact members move between the middle portion of the paths of said endless members.

5. In an arc-welding machine adapted to use a welding electrode having a conducting core and a non-conducting covering broken at spaced intervals to expose small areas of the core, means for feeding the electrode to the arc, welding current supply means, a support positioned adjacent the path of said electrode, a pair of endless members supported on said support for movement in a fixed path, the path of each of said endless members including curved end portions and straight middle portions to define between said endless members a groove having end portions of changing width and a middle portion of constant width, means connecting said endless members to said welding current supply means, an endless member positioned adjacent said electrode on the side opposite said support, spaced contact members fixed to said last mentioned endless member and movable through said groove to contact with said exposed areas and said first mentioned endless members, and means for moving said last mentioned endless member at the speed of the electrode.

6. In an arc-welding machine, the combination of a welding electrode, means for feeding the electrode to the arc, welding current supply means, a support positioned adjacent the path of said electrode, a pair of parallel spaced current conducting endless belts supported for movement in fixed paths on said support, means connecting said belts to said current supply means, a third endless belt supported for movement in a fixed path adjacent said electrode on the side opposite said support, spaced contact members fixed to said third endless belt adapted to contact with said pair of endless belts and said electrode and means for moving said third endless belt at the speed of the electrode.

ROBERT K. HOPKINS.